United States Patent [19]

Obara et al.

[11] Patent Number: 4,678,884
[45] Date of Patent: Jul. 7, 1987

[54] WIRE DISCHARGE MACHINING POWER SOURCE

[75] Inventors: Haruki Obara, Sagamihara; Masaya Ito; Masashi Tonamura, both of Hino, all of Japan

[73] Assignee: Fanuc Ltd, Minamitsuru, Japan

[21] Appl. No.: 807,509

[22] Filed: Nov. 22, 1985

[30] Foreign Application Priority Data

Mar. 26, 1984 [JP] Japan ................................. 59-56135

[51] Int. Cl.⁴ ............................................. B23H 1/02
[52] U.S. Cl. .................................. 219/69 P; 219/69 C
[58] Field of Search .................. 219/69 C, 69 P, 69 S, 219/69 G

[56] References Cited

U.S. PATENT DOCUMENTS

| | | | |
|---|---|---|---|
| 4,017,705 | 4/1977 | Bazhenov et al. | 219/69 P |
| 4,238,660 | 12/1980 | Bell, Jr. et al. | 219/69 C |
| 4,258,243 | 3/1981 | Bell, Jr. et al. | 219/69 M |
| 4,303,957 | 12/1981 | Bell, Jr. et al. | 219/69 S |
| 4,339,650 | 7/1982 | Tanaka et al. | 219/69 W |
| 4,347,425 | 8/1982 | Obara | 219/69 P |

FOREIGN PATENT DOCUMENTS

| | | | |
|---|---|---|---|
| 2410666 | 9/1974 | Fed. Rep. of Germany | 219/69 C |
| 47-46156 | 11/1972 | Japan | 219/69 C |
| 108397 | 9/1976 | Japan . | |
| 120934 | 9/1980 | Japan | 219/69 W |
| 59-93229 | 5/1984 | Japan | 219/69 C |
| 428900 | 10/1974 | U.S.S.R. | 219/69 C |
| 1079395A | 3/1984 | U.S.S.R. | 219/69 G |

Primary Examiner—A. D. Pellinen
Assistant Examiner—Geoffrey S. Evans
Attorney, Agent, or Firm—Staas & Halsey

[57] ABSTRACT

A wire discharge machining power source controls an average machining voltage value applied between a wire electrode (P) and a workpiece (W) to be zero to preent galvanic corrosion of the workpiece (W). A reverse voltage application time control circuit (2) detects the average machining voltage value and generates a pulse (S5) having a pulse width corresponding to a detected value. A reverse voltage regulating circuit (1) detects a difference between a reference voltage and a voltage applied between a transistor (T2) and a resistor (R2) upon application of the reverse voltage through the transistor (T2) and the resistor (R2), and supplies a difference signal, which corresponds to the detected difference, as an ON control signal to the transistor (T2) for a period corresponding to the width of the pulse (S5), thereby controlling the reverse voltage value and setting the average machining voltage value to zero.

13 Claims, 3 Drawing Figures

WIRE DISCHARGE MACHINING POWER SOURCE

BACKGROUND OF THE INVENTION

The present invention relates to a wire discharge machining power source, wherein in wire-cut discharge machining a voltage having a polarity opposite to that of a voltage applied during electric discharge machining, is applied between a wire electrode and a workpiece to set an average machining voltage to zero, thereby preventing electrolytic effect and hence galvanic corrosion.

In electric discharge machining using water as a working fluid, an electrolytic effect occurs. In particular, when a workpiece such as a carbide, which is easily subject to galvanic corrosion, is machined roughly, the workpiece tends to be embrittled, resulting in inconvenience. In second cutting, the surface of the workpiece is roughened by selective galvanic corrosion of particles constituting the workpiece due to the electrolytic decomposition. A finished surface is roughened, thus resulting in inconvenience. In order to prevent this, a technique is known to those skilled in the art wherein a voltage having a polarity opposite to that of a voltage applied during machining is applied between an electrode and a workpiece during nonmachining, and an average voltage applied throughout machining and nonmachining periods is set to zero to prevent the electrolytic effect.

A reverse voltage applied between the workpiece and the electrode may vary in accordance with a change in thickness of the workpiece and a leakage current flowing from the gap between the workpiece and the electrode and the like. When a peak value of the reverse voltage is too large, the electrode is greatly damaged. When positive discharge is performed with small energy, damage to the workpiece which is caused by reverse voltage discharge worsens the roughness of the machined surface. However, when a peak value of the reverse voltage is too small, the time for applying the reverse voltage must be prolonged, thus degrading machining efficiency. In order to solve the above problem encountered in electric discharge machining of the type wherein the zero average voltage is obtained by application of the reverse voltage, a reverse voltage peak value must be controlled.

SUMMARY OF THE INVENTION

It is an object of the present invention to provide a wire discharge machining power source with a circuit for applying, between a wire electrode and a workpiece during nonmachining, a voltage having a polarity opposite to that of a voltage applied during machining, so as to prevent an electrolytic effect, wherein variations in peak value of the reverse voltage are eliminated, the reverse voltage applying time can be automatically controlled, and the average machining voltage can be set to zero.

In order to achieve the above object of the present invention, there is provided a wire discharge machining power source for turning on a switching element to apply a voltage between a wire electrode and a workpiece so as to cause an electric discharge and for applying a reverse voltage having a polarity opposite to that of the voltage applied during machining when the switching element is turned off, the reverse voltage being applied between the wire electrode and the workpiece through a transistor and a resistor. A reverse voltage application time control circuit detects an average machining voltage applied between the wire electrode and the workpiece, and generates a pulse with a pulse width corresponding to the average machining voltage; and a reverse voltage regulating circuit generates an output with a value corresponding to a holding voltage of a sample/hold circuit for detecting and holding a difference between a reference voltage and a voltage between the transistor and the resistor upon application of the reverse voltage, the output from the reverse voltage regulating circuit being generated for a period corresponding to the pulse width of the pulse from the reverse voltage application time control circuit.

According to the present invention, in wire-cut discharge machining, the reverse voltage having a polarity opposite to that of the voltage applied during machining is applied between the wire electrode and the workpiece during nonmachining. At the same time, automatic adjustment is performed such that variations in the reverse voltage are eliminated to obtain a constant reverse voltage and the reverse voltage application time can be determined to set the average machining voltage to be zero. The electrolytic effect and hence galvanic corrosion of the workpiece can be prevented. In addition, damage to the electrode and the workpiece which is caused by an excessively high reverse voltage can be prevented. Furthermore, since the peak value of the reverse voltage is always optimized, the machining time can be shortened, thus improving machining efficiency.

DETAILED DESCRIPTION OF THE PREFERRED EMBODIMENT

An embodiment of the present invention will be described in detail with reference to the accompanying drawings.

Figure 1:
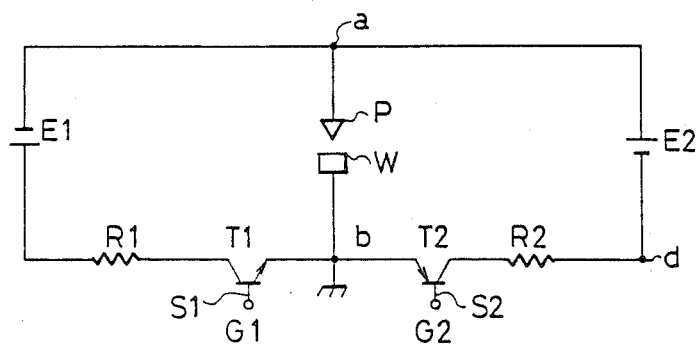
FIG. 1 is a circuit diagram of a wire discharge machining power source according to an embodiment of the present invention.

FIG. 1 shows a basic circuit of a wire discharge machining power source according to an embodiment of the present invention. Reference symbol P denotes a wire electrode; W, a workpiece; and E1, a DC power source. The power source E1 supplies a voltage between the workpiece W and the wire electrode P to perform electric discharge machining when a transistor T1 as a switching element is turned on through a current limiting resistor R1. The above arrangement is the same as a conventional transistor type discharge circuit. Reference symbol E2 denotes a DC power source for applying a reverse voltage between the workpiece W and the wire electrode P. The reverse voltage is applied between the workpiece W and the wire electrode P through a transistor T2 and a current limiting resistor R2. Reference symbols G1 and G2 denote base terminals of the transistors T1 and T2. The base terminals G1 and G2 receive a pulse S1 from a pulse generator (not shown) and a pulse S2 from a control circuit (to be described later). The transistor T2 is connected to a control circuit of FIG. 2 and thus is controlled to serve as a class "A" amplifier.

Figure 2:
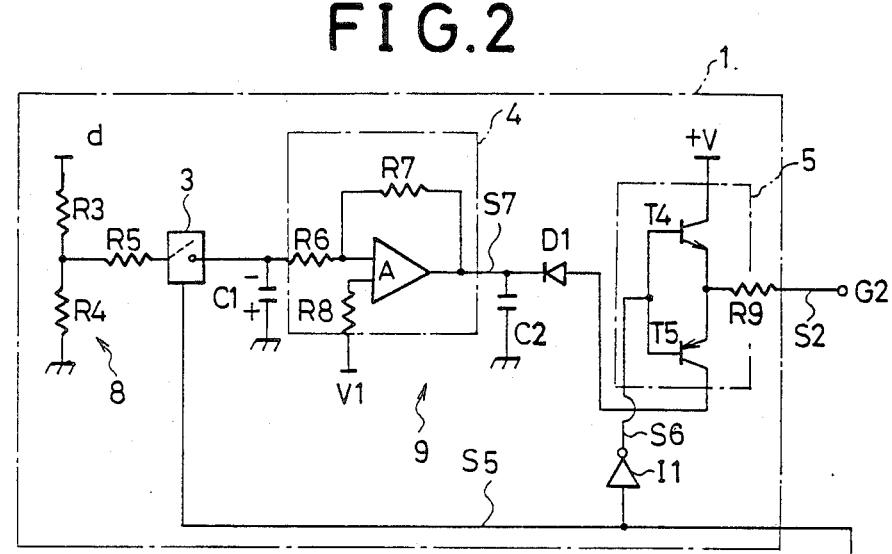
FIG. 2 is a circuit diagram of a reverse voltage application control circuit which is connected to the circuit of FIG. 1.
Figure 2:
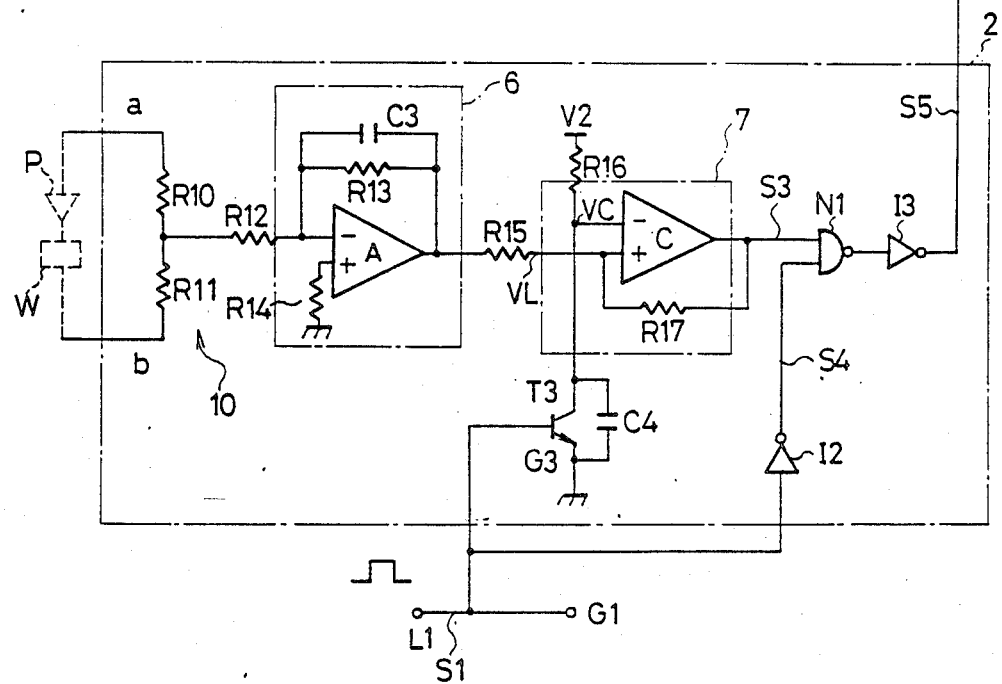

Referring to FIG. 2, reference numeral 1 denotes a reverse voltage regulating circuit for providing control to set constant a peak value of the reverse voltage applied between the wire electrode P and the workpiece W. Reference numeral 2 denotes a reverse voltage application time control circuit for controlling application time of the reverse voltage. The reverse voltage regulating circuit 1 comprises: a voltage divider 8 consisting of resistors R3 and R4 which divide a potential at a point d of FIG. 1 (i.e., a voltage across points d and b of FIG. 1) to obtain an input signal; a sample/hold circuit 9 consisting of an analog switch 3, a differential amplifier 4 and capacitors C1 and C2; a diode D1; a preamplifier 5; an inverter I1 and the like. An output S2 from the circuit 1 is supplied to the base G2 of the transistor T2. The reverse voltage application time control circuit 2 comprises: a voltage divider 10 consisting of resistors R10 and R11 which divide a voltage across terminals a and b of FIG. 1 (i.e., a voltage between the wire electrode P and the workpiece W) so as to obtain an input voltage; a smoothing circuit 6 for smoothing the input voltage; a comparator 7; a transistor T3 which is turned on upon reception of the signal S1 (for turning on the transistor T1) at its base G3 from a pulse generator (not shown) through an input terminal L1; a capacitor C4 connected in parallel with the transistor T3; a NAND gate N1; inverters I2 and I3 and the like. An output S5 from the reverse voltage application time control circuit 2 is supplied to the preamplifier 5 through the analog switch 3 and the inverter I1 of the reverse voltage regulating circuit 1.

Figure 3:
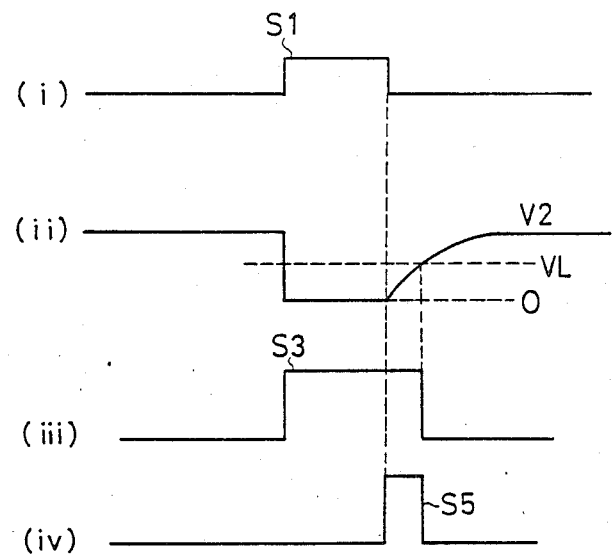
FIG. 3 is a timing chart for explaining the operation of the circuit of FIG. 2.

The operation of the power source according to this embodiment will now be described with reference to the timing chart of FIG. 3.

Briefly, in the basic circuit of FIG. 1, the pulse S1 from the pulse generator (not shown) is supplied to the base G1 of the transistor T1. The pulse S1 is kept on for a predetermined period shown in FIG. 3(i) and is periodically generated. The transistor T1 is turned on upon generation of the pulse S1 to cause the DC power source E1 to apply a voltage between the wire electrode P and the workpiece W, thereby causing an electric discharge. Thereafter, the pulse S1 is disabled to turn off the transistor T1. At the same time, the pulse S2 from the reverse voltage regulating circuit 1 is supplied to the gate G2 of the transistor T2 which is then turned on, thereby causing the power source E2 to apply the reverse voltage between the wire electrode P and the workpiece W. This operation is repeated upon generating and falling of the pulse S1.

As shown in FIG. 2, a gap voltage between the wire electrode P and the workpiece W is divided by the resistors R10 and R11, and the divided voltage is applied to the reverse voltage application time control circuit 2. The gap voltage is also smoothed by the smoothing circuit 6 in the reverse voltage application time control circuit 2. Therefore, an output from the smoothing circuit 6 represents an average value (i.e., an averge machining voltage) of voltages applied between the wire electrode P and the workpiece W throughout the ON and OFF times (during machining and nonmachining). The average value is represented by VL as shown in FIGS. 2 and 3. The average machining voltage display output (to be referred to as an average machining voltage hereinafter) VL is supplied to the noninverting input terminal of the comparator 7. Since the base G3 of the transistor T3 is connected to the input terminal L1, the transistor T3 is turned on upon generation of the pulse S1 for turning on the transistor T3. A voltage VC supplied to the inverting input terminal of the comparator 7 is decreased from a biasing voltage V2 to 0 V at the leading edge of the pulse S1, as shown in FIG. 3(ii). When the ON time has elapsed (i.e., when the transistor T3 is turned off) charging of the capacitor C4 is started, as shown in FIG. 3(ii), so that a charge voltage VC is applied to the inverting input terminal of the comparator 7. The comparator 7 compares the voltage VL with the voltage VC. While the charge voltage VC from the capacitor C4 is kept lower than the average machining voltage VL, the comparator 7 continues to generate a pulse S3 as shown in FIG. 3(iii). The output S3 from the comparator 7 and a signal S4 obtained by inverting the pulse S1 through the inverter I2 are supplied to the NAND gate N1. An output from the NAND gate N1 is inverted through the inverter I3. The inverter I3 generates a pulse S5 shown in FIG. 3(iv). The output pulse S5 causes the analog switch 3 in the reverse voltage regulating circuit 1 to turn on and is inverted by the inverter I1. An inverted signal is supplied as a pulse S6 to the preamplifier 5 which is then operated. The width of the output pulse S5 from the reverse voltage application time control circuit 2 varies in accordance with the magnitude of the average machining voltage VL output from the smoothing circuit 6. When the level of the average machining voltage VL comes near zero in FIG. 3(ii), the width of the output pulse S5 shown in FIG. 3(iv) is decreased. However, when the level of the average machining voltage VL is increased, the output pulse width is increased. Even if the level of the average machining voltage VL is held zero, a low output voltage is generated from the smoothing circuit 6 since the circuit 6 does not have an infinite gain. In order to guarantee the output voltage from the smoothing circuit 6, a low voltage may be added to the input voltage (i.e., the divided voltage from the resistors R10 and R11) with the summed voltage being applied to the smoothing circuit 6.

On the other hand, the reverse voltage regulating circuit 1 receives the divided voltage from the voltage divider 8 consisting of the resistors R3 and R4, for dividing the potential at the point d of the basic circuit of FIG. 1 (i.e., the voltage across the points b and d). The divided voltage is applied to the sample/hold circuit 9 consisting of the analog switch 3, the capacitor C1, the differential amplifier 4 and the capacitor C2. When the analog switch 3 is turned on in response to the pulse S5 (FIG. 3(iv)) from the reverse voltage application time control circuit 2, the capacitor C1 is charged with the divided voltage. The capacitor C1 is charged in the polarity shown in FIG. 2 while the switch 3 is kept on. A difference between the charge voltage at the capacitor C1 and a reference voltage V1 is amplified by the differential amplifier 4. An output voltage S7 from the differntial amplifier 4 charges the capacitor C2 which is thus kept at a potential corresponding to the potential between the points b and d.

The output S6 obtained by inverting the output from the reverse voltage application time control circuit 2 by means of the inverter I1, is applied to the preamplifier 5 for causing the transistor T2 (as a constituting component of the circuit for applying the reverse voltage between the workpiece W and the wire electrode P) to serve as a class "A" amplifier. In response to the input S6, the preamplifier 5 generates a negative pulse S2 of a voltage corresponding to the charge voltage of the capacitor C2, so that the transistor T2 is turned on. For this reason, the reverse voltage with a predetermined peak value is applied between the wire electrode P and the workpiece W. When the machining area of the workpiece W is increased, the leakage current is increased, or the gap voltage between the wire electrode P and the workpiece W decreases, so that the voltage (i.e., the potential at the point d) across the points b and d of FIG. 1 is inversely increased. For this reason, the negative voltage charged and held by the capacitor C2 is also lowered, and the output S2 from the preamplifier 5 is a lower negative voltage. This voltage is applied to the base G2 of the pnp transistor T2, so that a current tends to easily flow through the transistor T2. A resistance between the points b and d and hence a voltage therebetween are decreased, and a voltage between the wire electrode P and the workpiece W is increased. However, when the machining area of the workpiece W is decreased or the leakage current is small, the gap voltage is increased and the voltage between the points b and d is decreased. Accordingly, the negative charge voltage of the capacitor C2 decreases, and a considerably low negative voltage is not applied to the base G2 of the transistor T2. Therefore, the voltage between the points b and d is high, the voltage between the wire electrode P and the workpiece W is kept low. The voltage variation between the wire electrode P and the workpiece W which is influenced by the machining area of the workpiece W and the leakage current is automatically controlled, thereby obtaining a predetermined voltage. The negative output S2 from the preamplifier 5 is generated for the pulse width of the pulse S5, which varies in response to a change in average machining voltage (FIG. 3(iv)) from the reverse voltage application time control circuit 2. The reverse voltage having the predetermined peak value and a pulse width for setting the average machining voltage to zero, is applied between the wire electrode P and the workpiece W.

In the above embodiment, a transistor discharge circuit of FIG. 1 is exemplified as the basic circuit of the wire discharge machining power source. However, the present invention is not limited to the power source of the type described above. For example, a capacitor may be connected between the terminals a and b of FIG. 1 to constitute a transistor-controlled capacitor discharge circuit for charging/discharging the capacitor to achieve electric discharge machining.

What is claimed is:

1. A wire discharge machining power source for turning on a switching element to apply a voltage from a first power supply between a wire electrode and a workpiece during machining so as to cause an electric discharge, and for applying a reverse voltage, having a polarity opposite to that of the voltage applied during machining, when the switching element is turned off, the reverse voltage being applied from a second power supply between the wire electrode and the workpiece through a series circuit consisting of a transistor and a resistor and connected in series with the second power supply, comprising:
   a reverse voltage application time control circuit, coupled to the wire electrode and the workpiece, for detecting a value of an average machining voltage applied between the wire electrode and the workpiece, and for generating a pulse with a pulse width corresponding to the average machining voltage value; and
   a reverse voltage regulating circuit, coupled to the transistor and said reverse voltage application time control circuit, and having a sample/hold circuit for detecting and holding a difference between a reference voltage and a voltage across the series circuit upon application of the reverse voltage, the voltage across the series circuit being increased and decreased upon a decrease and an increase, respectively, in the voltage applied between the wire electrode and the workpiece, said reverse voltage regulating circuit for generating an output with a value corresponding to a holding voltage of said sample/hold circuit, the output from said reverse voltage regulating circuit being generated for a period corresponding to the pulse width of the pulse from said reverse voltage application time control circuit.

2. A wire discharge machining power source according to claim 1, wherein the switching element receives an ON pulse and wherein said reverse voltage application time control circuit comprises:
   means for dividing the voltage applied between the wire electrode and the workpiece;
   a smoothing circuit, coupled to said dividing means, for smoothing the voltage obtained by dividing the voltage applied between the wire electrode and the workpiece;
   a capacitor, connected to receive the ON pulse for the switching element, which is discharged for the period of the ON pulse for said switching element and which starts charging upon falling of the ON pulse;
   a comparator, coupled to said capacitor and said smoothing circuit, for continuously generating an output until a charge voltage at said capacitor reaches the output voltage from said smoothing circuit; and
   a gate circuit, coupled to said comparator and said reverse voltage regulating circuit, for generating an output while the output from said comparator is being generated and the ON pulse is kept on.

3. A wire discharge machining power source according to claim 1, wherein said sample/hold circuit includes a capacitor for holding the voltage across the series circuit.

4. A wire discharge machining power source according to claim 3, wherein said sample/hold circuit further includes:
   an operational amplifier having an inverting inpu terminal connected to said capacitor and having an output terminal; and
   a second capacitor, connected to the output terminal of said operational amplifier, for holding an output voltage from said operational amplifier.

5. A wire discharge machining power source according to claim 4, wherein said reverse voltage regulating circuit includes a preamplifier, coupled to said second capacitor, said reverse voltage application time control circuit, and the transistor, for generating an output corresponding to the voltage held by said second capacitor for the period corresponding to the pulse width of the output pulse from said reverse voltage application time control circuit.

6. A wire discharge machining power source according to claim 2, wherein said sample/hold circuit includes a capacitor for holding the voltage across the series circuit.

7. A wire discharge machining power source according to claim 6, wherein said sample/hold circuit further includes:
an operational amplifier having an inverting input terminal connected to said capacitor and having an output terminal; and
a second capacitor, connected to the output terminal of said operational amplifier, for holding an output voltage from said operational amplifier.

8. A wire discharge machining power source according to claim 7, wherein said reverse voltage regulating circuit includes a preamplifier, coupled to said second capacitor, said reverse voltage application time control circuit, and the transistor, for generating an output corresponding to the voltage held by said second capacitor for the period corresponding to the pulse width of the output pulse from said reverse voltage application time control circuit.

9. A wire discharge machining power source, coupled to first and second power supplies, for machining a workpiece, comprising:
a wire electrode positioned adjacent the workpiece;
first means, coupled to the first power supply, said wire electrode and the workpiece, for selectively applying a voltage from the first power supply between said wire electrode and the workpiece, so as to cause an electric discharge during machining;
second means, coupled to the second power supply, said wire electrode and the workpiece, for applying a reverse voltage, having a polarity opposite that of the voltage applied during machining, when the voltage is not being applied by said first means, the reverse voltage being applied from the second power supply between said wire electrode and the workpiece, said second means including a series circuit consisting of a transistor connected to the workpiece and a resistor connected to said transistor, said series circuit connected in series with the second power supply;
third means for detecting the value of an average machining voltage applied between said wire electrode and the workpiece, and for generating a pulse having a pulse width corresponding to the average machining voltage value; and
fourth means for detecting and holding the difference between a reference voltage and a voltage across said series circuit when the reverse voltage is applied, the voltage across the series circuit being increased and decreased upon a decrease and an increase, respectively, in the voltage applied between the wire electrode and the workpiece, said fourth means for generating an output having a value corresponding to the held voltage difference, the output of said fourth means being generated for a period corresponding to the pulse width of the pulse generated by said third means.

10. A wire discharge machining power source according to claim 9, wherein:
said third means comprises a reverse voltage application time control circuit coupled to said wire electrode and the workpiece, for controlling the average machining voltage value to be zero; and
said fourth means comprises a reverse voltage regulating circuit coupled to said transistor and said reverse application time control circuit, the output of said reverse voltage regulating circuit being provided to turn on said transistor, so that a peak value of the reverse voltage is controlled to be a predetermined value.

11. A wire discharge machining power source according to claim 10, wherein said first means includes a switching element through which the voltage is selectively applied between said wire electrode and the workpiece.

12. A wire discharge machining power source according to claim 11, wherein said reverse voltage regulating circuit comprises a sample/hold circuit including a capacitor for holding the voltage across the series circuit.

13. A wire discharge machining power source according to claim 11, wherein said reverse voltage regulating circuit includes a sample/hold circuit for detecting and holding the difference between the reference voltage and the voltage across said series circuit upon application of the reverse voltage, wherein said sample/hold circuit comprises:
a first capacitor for holding the voltage across said series circuit;
an operational amplifier having an inverting input terminal connected to said first capacitor and having an output terminal;
a second capacitor, connected to the output terminal of said operational amplifier, for holding an output voltage for said operational amplifier; and
a preamplifier, coupled to said second capacitor, said reverse voltage application time control circuit, and said transistor, for generating an output corresponding to the voltage held by said second capacitor for the period corresponding to the pulse width of the output pulse from said reverse voltage application time control circuit.

* * * * *

UNITED STATES PATENT AND TRADEMARK OFFICE
CERTIFICATE OF CORRECTION

PATENT NO. : 4,678,884

DATED : JULY 7, 1987

INVENTOR(S) : HARUKI OBARA ET AL.

Page 1 of 2

It is certified that error appears in the above-identified patent and that said Letters Patent is hereby corrected as shown below:

FRONT PAGE, "[22] Filed: November 22, 1985" should be

-- [22] PCT Filed: March 25, 1985

[86] PCT No.: PCT/JP85/00145

§371 Date: November 22, 1985

§102(e): November 22, 1985

[87] PCT Pub. No.: WO85/04353

PCT Pub. Date: October 10, 1985--.

[57] ABSTRACT, line 4, "preent" should be --prevent--.

Col. 3, line 61, "averge" should be --average--.

UNITED STATES PATENT AND TRADEMARK OFFICE
CERTIFICATE OF CORRECTION

PATENT NO. : 4,678,884

DATED : JULY 7, 1987

INVENTOR(S) : HARUKI OBARA ET AL.

Page 2 of 2

It is certified that error appears in the above-identified patent and that said Letters Patent is hereby corrected as shown below:

Col. 4, line 58, "differntial" should be --differential--.

Col. 6, line 50, "inpu" should be --input--.

Signed and Sealed this

Twenty-ninth Day of March, 1988

Attest:

DONALD J. QUIGG

*Attesting Officer*  *Commissioner of Patents and Trademarks*